(12) United States Patent
Kleinsasser (10) Patent No.: US 8,939,109 B2
(45) Date of Patent: Jan. 27, 2015

(54) ANIMAL FEEDER WITH ADJUSTMENT OF A FEED DISCHARGE OPENING

(71) Applicant: Crystal Spring Colony Farms Ltd., Ste Agathe (CA)

(72) Inventor: Jonathan Kleinsasser, Ste Agathe (CA)

(73) Assignee: Crystal Spring Colony Farms Ltd, Ste. Agathe, Manitoba (CA)

( * ) Notice: Subject to any disclaimer, the term of this patent is extended or adjusted under 35 U.S.C. 154(b) by 304 days.

(21) Appl. No.: 13/675,777

(22) Filed: Nov. 13, 2012

(65) Prior Publication Data

US 2014/0130746 A1    May 15, 2014

(51) Int. Cl.
*A01K 5/00*    (2006.01)

(52) U.S. Cl.
CPC .............. *A01K 5/00* (2013.01); *A01K 5/02225* (2013.01)
USPC ....................................................... 119/53.5

(58) Field of Classification Search
CPC ......... A01K 5/0225; A01K 5/00; A01K 5/02; A01K 5/0275
USPC ................... 119/51.5, 53, 53.5, 54
See application file for complete search history.

(56) References Cited

U.S. PATENT DOCUMENTS

| | | | | |
|---|---|---|---|---|
| 1,719,245 | A * | 7/1929 | Smidley | 119/53.5 |
| 3,552,360 | A * | 1/1971 | Nelson | 119/53.5 |
| 4,242,985 | A * | 1/1981 | Freeborn | 119/54 |
| 4,660,508 | A | 4/1987 | Kleinsasser | |
| 5,603,285 | A | 2/1997 | Kleinsasser | |
| 6,637,368 | B2 | 10/2003 | Bondarenko | |
| 6,923,142 | B2 * | 8/2005 | Kleinsasser | 119/53 |
| 7,036,455 | B2 * | 5/2006 | Loewe | 119/53 |
| 7,975,648 | B2 * | 7/2011 | Kleinsasser | 119/53 |
| 8,573,157 | B2 * | 11/2013 | Bondarenko et al. | 119/53.5 |

* cited by examiner

*Primary Examiner* — Yvonne Abbott

(74) *Attorney, Agent, or Firm* — Adrian D. Battison; Ade & Company Inc.

(57) ABSTRACT

An animal feeder includes two feeder sections arranged end to end with a common hopper extension feeding individual hoppers above a shelf onto which feed can fall to be taken by the animal or dropped into a trough below the shelf. The height of the shelf is adjustable to change the feed rate by straps which are adjustable by a common longitudinal bar which is located at a selected adjustment position by meshing teeth. The portion of the lever is movable in a direction away from the plate a non-meshing position in which the bar can rotate around the pivot axis. A common water supply extends along both feeders and is heated by a common heating element.

24 Claims, 9 Drawing Sheets

ANIMAL FEEDER WITH ADJUSTMENT OF A FEED DISCHARGE OPENING

This invention relates to an animal feeder with an adjustable feed discharge opening thus adjusting the amount of feed which is allowed to pass through the opening.

BACKGROUND OF THE INVENTION

Various arrangements of animal feeder are provided in which there is a trough into which feed can be deposited from a hopper above the trough. In most cases the feed material to be deposited can vary in particle size and viscosity so that it is often desirable to provide an arrangement which allows an adjustment of the opening through which the material can feed from the hopper into the trough.

In many cases the opening is provided by a simple shutter at the gap between the Hopper and the trough where the height of the shutter can be adjusted to vary the gap at the bottom of the shutter.

In U.S. Pat. No. 4,660,508 (Kleinsasser) issued Apr. 28, 1987 is disclosed a feeder which provides a shelf above the trough with the hopper discharging onto the shelf in a manner so that the feed remains on the shelf but can be moved from the shelf to the trough by the animal as required. Feeders of this type have achieved significant commercial success. Adjustment of the height of the shelf is necessary for the purpose of accommodating different types of feed and different feed rates and this is obtained by a hand crank screw which operates with a threaded nut to raise and lower a strap carrying the shelf. The screw is used in adjustment of this device because the deposit of the feed onto the self requires an accurate adjustment of the distance between the shelf and the bottom edge of the hopper so that cruder systems with a less fine adjustment have been rejected.

U.S. Pat. No. 5,603,285 also of Kleinsasser issued Feb. 18, 1997 discloses a further similar device where additional adjustment of the height of the shelf is possible but again fine adjustment is provided by a screw.

It is also known to provide arrangements in which adjustment in a relatively crude manner is effected by selecting one of a plurality of holes in which to locate the pin of an adjustment lever so that the adjustment is effected step by step. As the holes must be necessarily a certain distance apart, such an adjustment provides a relatively crude distance of adjustment so that the fine tuning necessary for determining the specific dimensions of an opening to accurately control the rate of flow of feed material is not possible in such a system. One example is shown in U.S. Pat. No. 6,637,368 (Bondarenko) issued Oct. 28, 2003. This provides a link which extends along one end wall of a feeder and a lever can be moved to place a pin into a selected one of a number of holes in the end wall.

In U.S. Pat. No. 6,923,142 issued Aug. 2, 2005 is disclosed and an arrangement in which a shelf is carried on straps which extend along the end walls of the hopper and are movable by an adjustment linkage defined by a plate carried on the end wall and a manually adjustable lever mounted for pivotal movement on the plate. The plate has an arcuate outer edge which is serrated to define an arcuate row of teeth and the lever is formed by a flat of sheet material which lies in a plane parallel to and slides over the plate and includes a portion thereof which is bent out of a plane of the lever into the plane of the plate which is also serrated with a row of teeth shaped to mesh with the teeth of the arcuate portion. The portion of the lever is movable in a direction away from the plate a non-meshing position in which the lever is free to move around the pivot axis.

SUMMARY OF THE INVENTION it is one object of the invention to provide an improved feeder of the above general type.

According to a first aspect of the invention there is provided an animal feeder comprising:

a hopper for containing a feed material to be dispensed to an animal for feeding therefrom;

a receptacle for receiving the feed from the hopper from which the animal can take the feed;

an elongate opening through which the feed passes so that the amount of feed discharged from the hopper to the receptacle is controlled by a width of the opening;

the opening being defined on one side by an elongate member extending along the opening and movable transversely of the opening to change the width of the opening along the length of the opening;

and an adjustment linkage for operating adjustment movement of the elongate member, the linkage including:

a plurality of upstanding support members at spaced positions along the elongate member;

each support member being movable upwardly and downwardly to different heights generally along its length to raise and lower the elongate member;

a gauge for indicating to a user a height of at least one of the upstanding support members such that the user can select a required height;

an adjustment bar interconnecting all of the upstanding support members for common adjustment of the height thereof;

and a manually adjustable lever mounted for pivotal movement about a pivot axis for rotating the bar so as to commonly adjust the upstanding support members.

Preferably the bar is located in the hopper at a height above the elongate member.

Preferably a respective one of the upstanding support members is located at each respective end of the elongate member and at least one additional upstanding support member is located between the ends.

Preferably there is provided a gauge at each end of the elongate member.

Preferably there is provided a lock member for holding one of the upstanding support members at a selected height.

Preferably the lock member is located at the gauge at one end wall of the hopper.

Preferably the lever is located at the gauge at one end wall of the hopper.

The lever can be located inside the hopper at one end of the feeder or can be located outside the hopper on one end of the feeder at height inaccessible by the animals.

Preferably the bar is mounted for pivotal movement around a pivot axis fixed relative to ends of the hopper and wherein there is provided a crank extending from the bar to each upstanding support member so that each upstanding support member is commonly adjusted in height by rotation of the bar around the axis.

Preferably the gauge comprises a plate defining a surface over which the crank moves, the surface defining an arcuate portion lying on an arc of a circle surrounding the pivot axis of the bar; wherein the arcuate portion of the surface is serrated to define an arcuate row of teeth; wherein the crank has an edge which is also serrated with a row of teeth shaped to mesh with the teeth of the arcuate portion; and wherein the crank is being movable from a meshing position locking the upstanding support member in a locked position to a non-meshing position in which the upstanding support member is free to move upwardly and downwardly.

Preferably the plate lies in a radial plane of the pivot axis and the arcuate row of teeth are located on an edge of the plate.

Preferably the edge of the plate is an outer edge facing radially outwardly of the axis.

Preferably the crank is formed by a flat of sheet material which lies in a plane parallel to and slides over the plate and wherein the crank includes a portion thereof which is bent out of a plane of the crank into the plane of the plate and carries the row of teeth of the crank on an edge thereof.

Preferably the feeder is of the known wet/dry type where there is provided a trough into which the feed can fall and wherein the elongate member comprises a shelf mounted above the trough arranged so that the animal can take feed from the shelf or can move the feed from the shelf to the trough and wherein the upstanding support member is connected to the shelf for adjustment of the height thereof relative to a bottom edge of the hopper defining the opening therebetween.

Preferably the feeder comprises a pair of feeders arranged end to end each having a respective hopper, a respective trough and a respective shelf; wherein there is provided a water line extending along the pair of feeders underneath the shelf for supplying water to the troughs and wherein there is provided a heater element at the water line and extending along the water line along both of the feeders so as to provide heat to both feeders from a common heater element.

Preferably the common heater element is located inside the water line.

According to a second aspect of the invention there is provided an animal feeder comprising:
- a pair of feeders arranged end to end, each feeder comprising:
  - a hopper for containing a feed material to be dispensed to an animal for feeding therefrom;
  - a trough for receiving the feed from the hopper from which the animal can take the feed;
  - a shelf mounted above the trough arranged so that the animal can take feed from the shelf or can move the feed from the shelf to the trough;
  - the shelf defining with a bottom edge of the hopper an elongate opening through which the feed passes so that the amount of feed discharged from the hopper to the receptacle is controlled by a width of the opening;
- wherein there is provided a water line extending along the pair of feeders underneath the shelf for supplying water to the troughs;
- and wherein there is provided a heater element at the water line and extending along the water line along both of the feeders so as to provide heat to both feeders from a common heater element.

Preferably the common heater element is located inside the water line.

Preferably the two hoppers of the feeders are connected to a common upper hopper extension which supplies feed to the hoppers of both of the feeders.

Preferably the hoppers of the two feeders are spaced so as to define a separate area therebetween and there is provided a divider member in the common hopper extension to direct the feed into one or other of the hoppers.

Preferably there is provided an adjustment linkage for operating common adjustment movement of the shelf of each of the hoppers, the linkage including:
- a plurality of upstanding support members at spaced positions along the shelves of the hoppers;
- each support member being movable upwardly and downwardly to different heights generally along its length to raise and lower the shelves;
- a gauge for indicating to a user a height of at least one of the upstanding support members such that the user can select a required height;
- an adjustment bar interconnecting all of the upstanding support members for common adjustment of the height thereof;
- and a manually adjustable lever mounted for pivotal movement about a pivot axis for rotating the bar so as to commonly adjust the upstanding support members.

The above construction of the wet/dry feeder is well known where the shelf holds the feed in dry condition above the trough but can be added to water in the trough for a wet condition. In this arrangement, the link is connected to the shelf for adjustment of the height thereof relative to a bottom edge of the hopper defining the opening therebetween.

However the same construction can be used with a conventional dry feeder where the adjustment is effected by moving a plate which extends generally upright from a base wall of the trough so that a bottom edge of the plate cooperates with the base wall in defining the opening. Typical dry feeders are commonly, but not necessarily, double sided so that the same hopper feeds two sides of a trough with each side having its own adjustment plate. In this case there my be two such adjustment devices as defined above at each end of the hopper so that each plate is independently adjusted by a pair of adjustment devices one at each end wall of the hopper. Alternatively the two plates may be adjusted commonly by a single pair of adjustment devices depending upon the requirements of the customer.

According to a third aspect of the invention there is provided an animal feeder comprising:
- a pair of feeders arranged end to end, each feeder comprising:
  - a hopper for containing a feed material to be dispensed to an animal for feeding therefrom;
  - a receptacle for receiving the feed from the hopper from which the animal can take the feed;
  - an elongate opening through which the feed passes so that the amount of feed discharged from the hopper to the receptacle is controlled by a width of the opening;
  - the opening being defined on one side by an elongate member extending along the opening and movable transversely of the opening to change the width of the opening along the length of the opening;
  - and an adjustment linkage for operating common adjustment movement of the elongate members of the feeders, the linkage including:
    - a plurality of upstanding support members at spaced positions along the elongate member;
    - each support member being movable upwardly and downwardly to different heights generally along its length to raise and lower the elongate members;
    - a gauge for indicating to a user a height of at least one of the upstanding support members such that the user can select a required height;
    - an adjustment bar interconnecting all of the upstanding support members for common adjustment of the height thereof;
    - and a manually adjustable lever mounted for pivotal movement about a pivot axis for rotating the bar so as to commonly adjust the upstanding support members.

Preferably the two hoppers of the feeders are connected to a common upper hopper extension which supplies feed to the hoppers of both of the feeders.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

An elongate feeder is generally indicated at 10 and includes a hopper 11 and a trough 12. The trough is connect to the hopper by end walls 13 so as to form an integral structure with generally open top 14 through which feed can be inserted for containing in the hopper and for discharge into the trough 12 for feeding by a plurality of animals side by side. In the embodiment shown there is provided a shelf 15 with a generally horizontal surface 16, an upturned edge 17 and a downwardly turned lip 18 all of which are substantially as described in the above patents of Kleinsasser. Further details of the structure therefore can be obtained by reference to the above patents so that no further detailed description is necessary herein. A water supply 100 into the trough is provided with a supply line 101 spanning the length of the feeder underneath the shelf and including a series of longitudinally spaced nozzles 102 under control operation or operation by the animal as is known in the above patents.

The shape and arrangement of the hopper and trough can be varied and can provide either a two sided structure as shown or a single sided structure.

Figure 1:
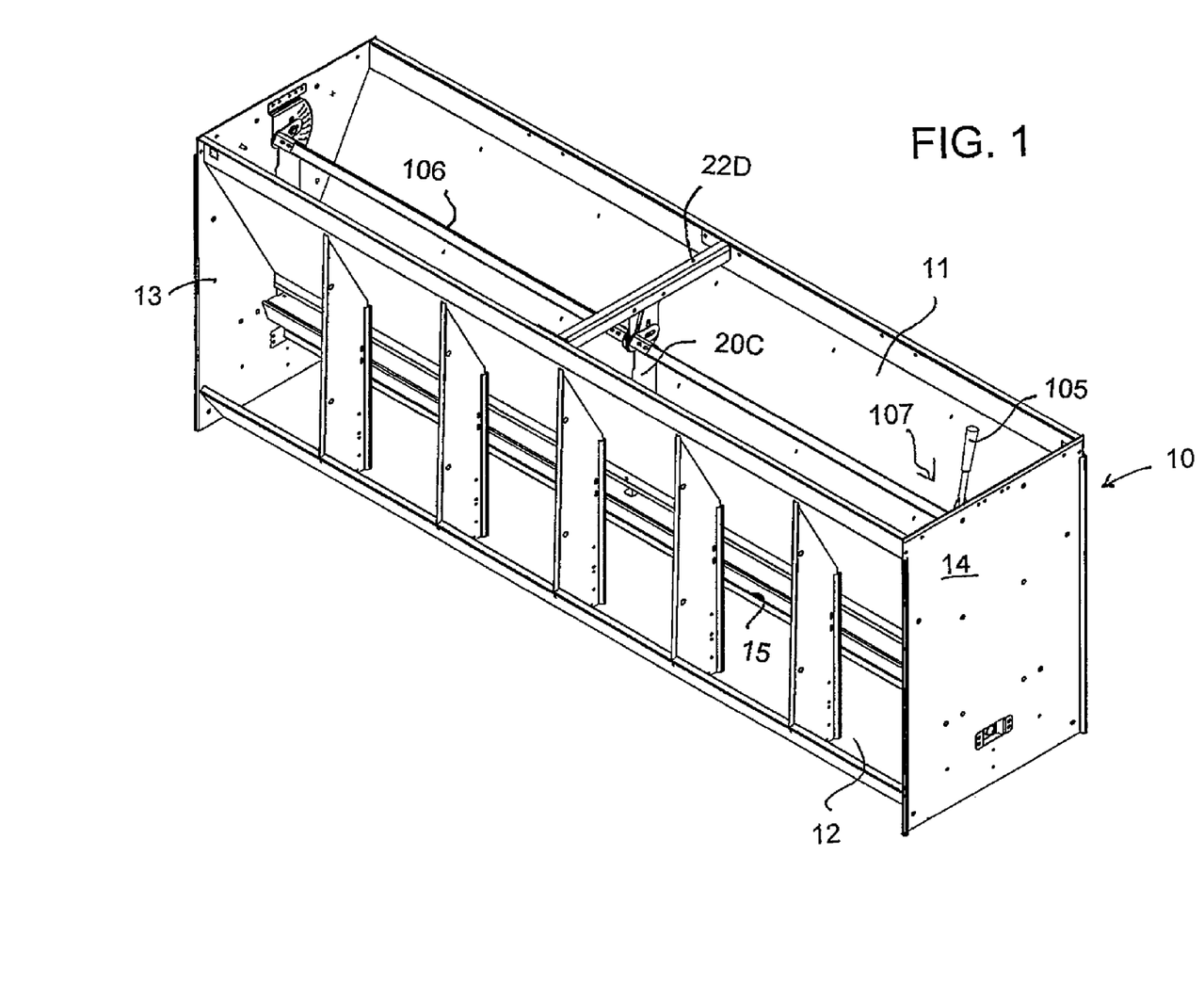
FIG. 1 is an isometric view of a feeder according to the present invention.
Figure 4:
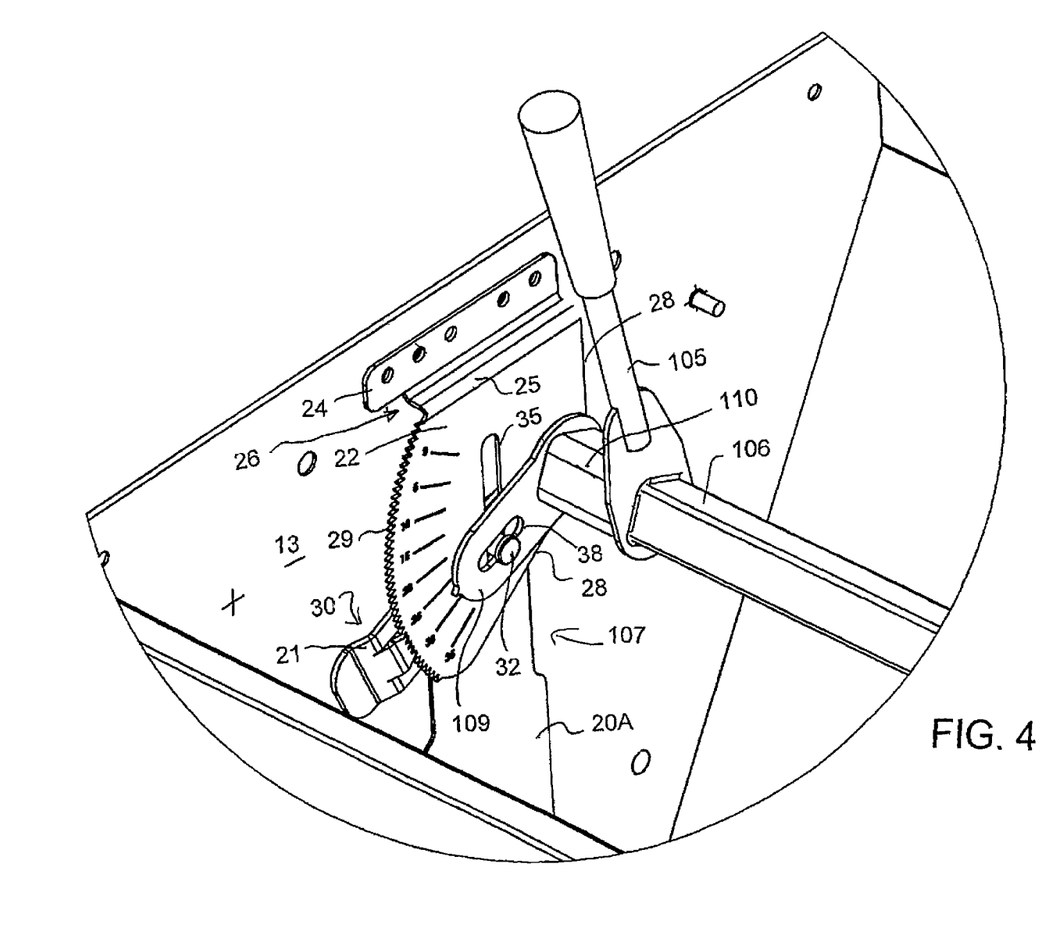
FIG. 4 is an isometric view on an enlarged scale of the adjustment mechanism of FIG. 1.
Figure 5:
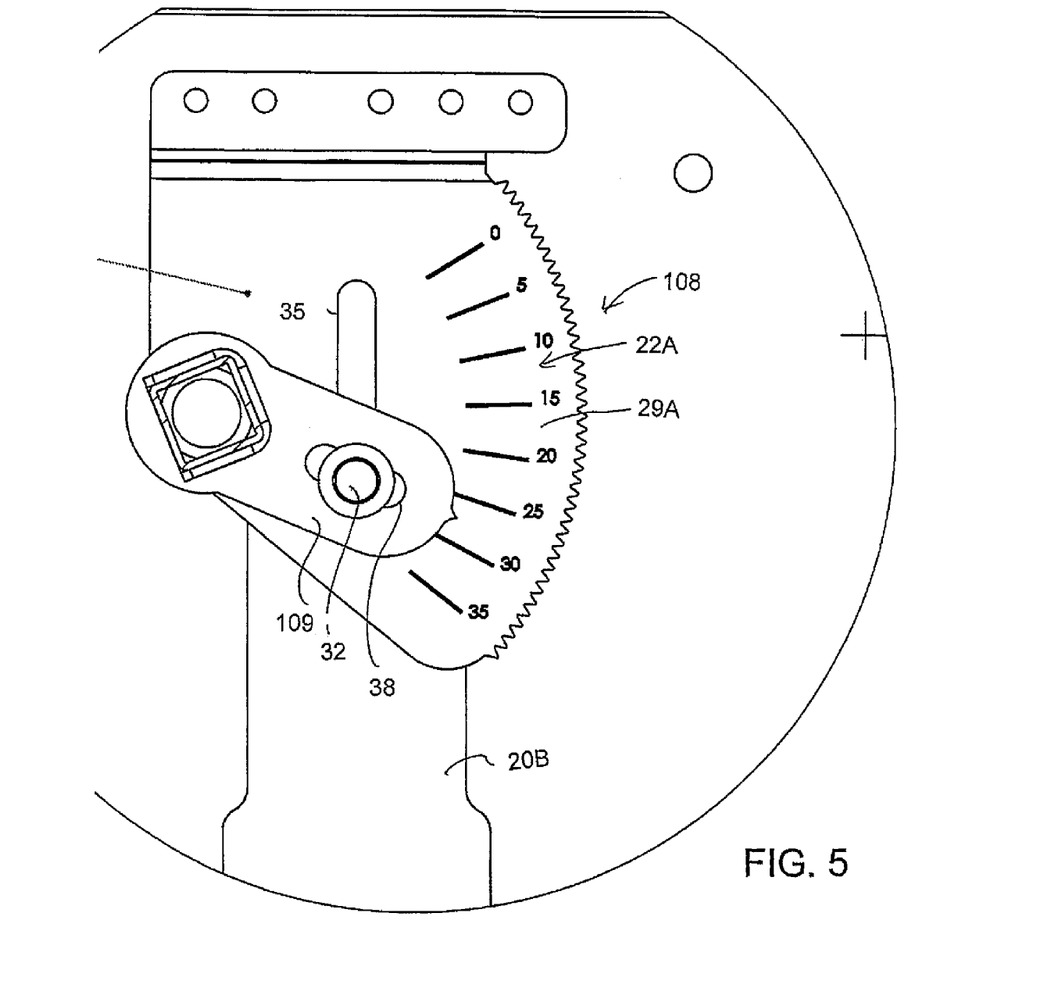
FIG. 5 is an elevational view of the other end adjustment mechanism of FIG. 1.
Figure 6:
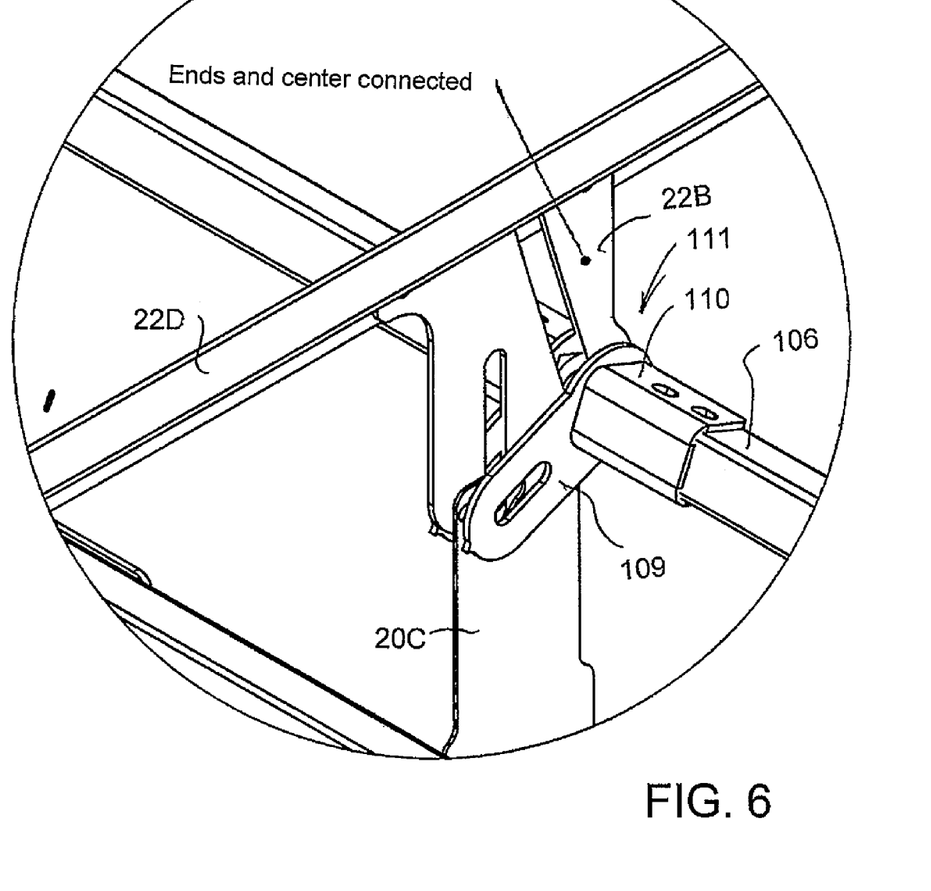
FIG. 6 is an isometric view on an enlarged scale of the adjustment mechanism at the center support of FIG. 1.

The height of the shelf relative to the end wall of the hopper is adjusted by raising straps 20 where two straps are arranged at a respective ends of the shelf with one or more intermediate straps part way along the feeder. As the feeder in this arrangement is relatively long, additional straps are typically required. Each of the end straps lies along the end wall 13 parallel to the end wall as shown in FIG. 1. The strap is raised and lowered by a lever 105 mounted on a bar 106 carried on the support plate 22 by a pivot pin 23. The support plate 22 as best shown in FIG. 4 includes an upper mounting flange 24 which is attached to the end wall 13. A bend portion 25 is arranged at right angles to the flange portion 24 and therefore supports the plate 22 at a spaced position from the wall 13 leaving a space 26 at the rear of the plate 22 and inside the end wall 13. The plate 22 is formed from sheet metal which is bent and cut to form the required shape as defined above so that the plate is suspended along the end wall with a bottom edge 27 and at two side edges 28 and 29. The pivot pin 23 is arranged adjacent the side edge 28 and approximately at a mid height of the plate.

The bar 106 is attached to a locking and gauge arrangement generally indicated at 107.

The locking and gauge arrangement generally 107 includes a lever 21 is also formed of sheet metal which is stamped and punched to form a generally elongate member with an end 30 at the pivot pin 23 and a second end 31 extended beyond the edge 29 of the plate. The lever is formed of flat sheet metal similar to that of the plate so that it lies in contact with the front face of the plate. The lever 21 is attached to the strap 20 by a pin 32 which passes through a hole in the lever and a hole in the strap. The lever includes an actuating arm 109 which is mounted on the bar 106 at a collar 110 so that rotation of the bar 106 operated by the lever 105 acts to cause the collar 110 to rotate and thus drive rotation of the lever 21 and the arm 109.

A slot 35 is provided in the plate 22 which guides movement of the pin 32 so that the pin is constrained to move vertically and thus move the strap 20 vertically. The length of the slot 35 between an upper end 36 and a lower end 37 provides a length of adjustment equal the allowable movement of the lever 21. A slot 38 in the lever 21 and in the arm 109 allows the pin to move in the vertical direction while accommodating the arcuate movement of the lever 21 and Arm 109 around the axis of the bar 106.

The edge 29 of the plate 22 faces away from the pivot axis 23A of the pivot pin 23 and is cut to form a series of teeth 39 along the edge 29 from an upper edge 40 to a lower edge 41. Thus the edge of the plate 29 forms an arcuate edge around the axis 23A with the teeth punched in the edge of the plate and facing away from the plate as a serrated edge.

The lever 21 is held flat against the surface of the plate 22 by a spring on the pin 32. The spring is held in place by a nut on the pin 32 so that the spring is compressed between the nut and the outer face of the lever 21. The pin 32 has a head behind the strap 20. The pivot pin 23 provides enough flexibility to allow the lever 21 to be moved away from the plate 22 compressing the spring 43 against the bias of the spring. The lever 21 has a hole 48 formed in the lever. The lever further has a recessed portion 49 which is bent downwardly from the plane of the lever into the plane of the plate 22. The hole and the recessed portion are formed by cutting through the plate along a line 50 which extends from an edge along the lever to a semi-circular portion and back along the lever to a second edge. This slit or cut in the sheet metal forming the lever allows a serrated edge 54 to be formed having teeth 55 at an edge of the hole 48 and forming an edge of the recessed portion 49. Thus the lever is in its normal position flat against the surface of the plate thus causing the teeth of the edge of the lever to be in meshing engagement with the teeth of the arcuate edge of the plate 22. The width of the teeth is equal on both surfaces so that the teeth are directly meshing. The number of teeth on the edge of the lever is very much less than the number of teeth on the arcuate edge of the plate since the lever is intended to move around the arcuate edge of the plate in an adjustment movement. However the amount of adjustment is equal the pitch of the teeth.

The lever 21 includes an end piece 58 which is bent in a direction away from the plate 22 so as to provide a handle or tab which can be readily grasped since it is sufficiently spaced from the end wall of the feeder to be readily accessible by the hand of the user.

Markings 59 are provided on the plate counting the number of teeth and numbered from zero at one end through to the total number at the other end of the arcuate edge of the plate. The hole 48 allows viewing of the markings through the hole onto the front surface of the plate so that the user can line up a centre line of the hole with a selected one of the markings.

In operation the meshing teeth arrangement of the lever and the plate allow a fine adjustment, bearing in mind that the teeth have a relatively fine pitch and bearing in mind that the distance of the pin 32 from the pivot access 23A is significantly less than the distance of the teeth from the pivot axis. Thus movement of one pitch of one tooth can be arranged to provide a movement of the shelf of a distance of the order of ⅟₃₂ to ⅟₁₆ inch.

However when required, the shelf can be moved rapidly down to a lowered position simply by grasping the lever and dropping it downwardly to the bottom end of the adjustment thus rapidly increasing the spacing between the bottom of the hopper and the shelf for cleaning or other operations where the distance needs to be rapidly opened. However when rapidly opened, the shelf can be rapidly returned back to its set position simply by the user recalling the number to which it was originally set and by adjusting it rapidly back to the selected number marked on the arcuate edge of the plate 22.

Therefore the adjustment linkage for operating adjustment movement of shelf includes the plurality of upstanding support members or straps 20 including the end straps 20A, 20B and at least one intermediate strap 20C at spaced positions along the elongate shelf. Each support strap is movable upwardly and downwardly to different heights along its length to raise and lower the shelf. At each end there is provided a gauge for indicating to a user a height the respective strap such that the user can select a required height. That is at the end 13 there is provided the locking and gauge arrangement 107. At the opposite end there is provided a gauge 108 which includes a symmetrically arranged plate 22 and a lever 21 with meshing teeth as previously described.

The adjustment bar 106 acts to interconnect all of the upstanding straps 20 for common adjustment of the height thereof by single adjustment of the manually adjustable lever 105 mounted for pivotal movement about the pivot axis of the bar 106 for rotating the bar so as to commonly adjust the upstanding straps.

The bar is mounted for rotation on the plate 22 at the gauge 107 and a symmetrical plate 22A at the end gauge 108. In the center for the strap 20C there is provided a similar plate 22B supported on cross beam 22D which carries the bar in a bearing 110. At each plate there is provided an arm 109 which actuates the movement of the strap 20 as the bar 106 rotates.

Thus the gauge 107 also provides a locking function in that the user releases the plate 21 from meshing engagement with the plate 22 allowing the adjustment to occur at the lever 105. The gauge indicates to the user the height adjustment so that the user can select a required height. The gauge at the other end confirms that the correct height selection has been entered. The center strap has no need of a gauge. Only one locking location is required. The lever 105 provides a sufficient length and strength that it can apply a relatively large force to the bar 106 to effect the adjustment when the hopper is filled with feed resting on the shelf.

The lever, as shown, is located inside the hopper at one end 13 of the feeder. However in an arrangement (not shown) the lever 105 can be outside the hopper on the outside of the end wall 13 at height inaccessible by the animals. As this arrangement is used with long feeders of greater height than might be typical in order to provide the adjustment at one location with a strong lever action, the feeder is often much higher than typical so that the lever is above the height which might be accessed by the animals at the feeder.

The bar 106 is mounted for pivotal movement around the pivot axis fixed relative to ends 13, 14 of the hopper and there is provided a crank 109 extending from the bar 106 to each upstanding support strap 20 so that each strap is commonly adjusted in height by rotation of the bar around the axis. This simplifies the adjustment and ensures that the lever 106 is accessible even when the hopper is filled.

As described above, the feeder is of the known wet/dry type where there is provided a trough into which the feed can fall and the elongate member comprises a shelf mounted above the trough arranged so that the animal can take feed from the shelf or can move the feed from the shelf to the trough. The straps are connected to the shelf for adjustment of the height thereof relative to a bottom edge of the hopper defining the opening therebetween.

Figure 2:
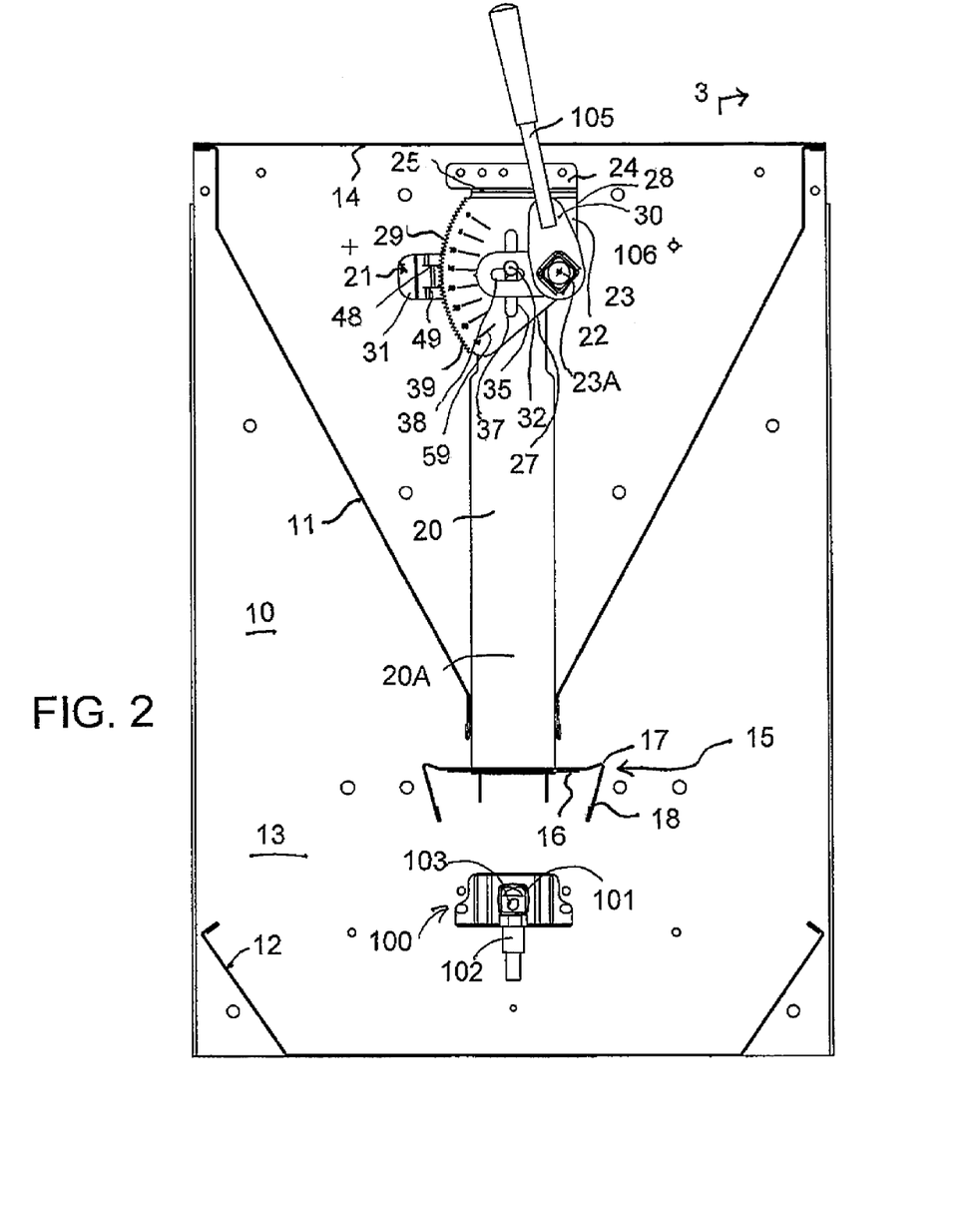
FIG. 2 is a cross-sectional view through one end of the feeder of FIG. 1.
Figure 3:
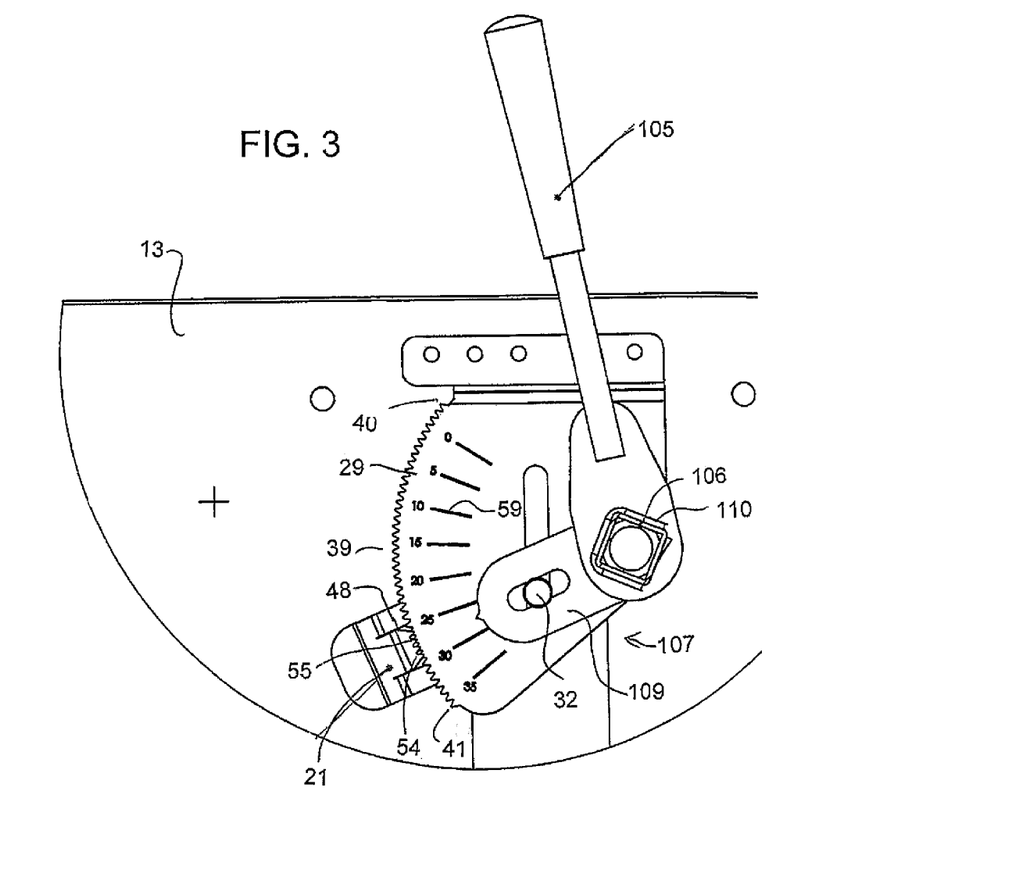
FIG. 3 is an elevational view on an enlarged scale of the adjustment mechanism of FIG. 1.
Figure 7:
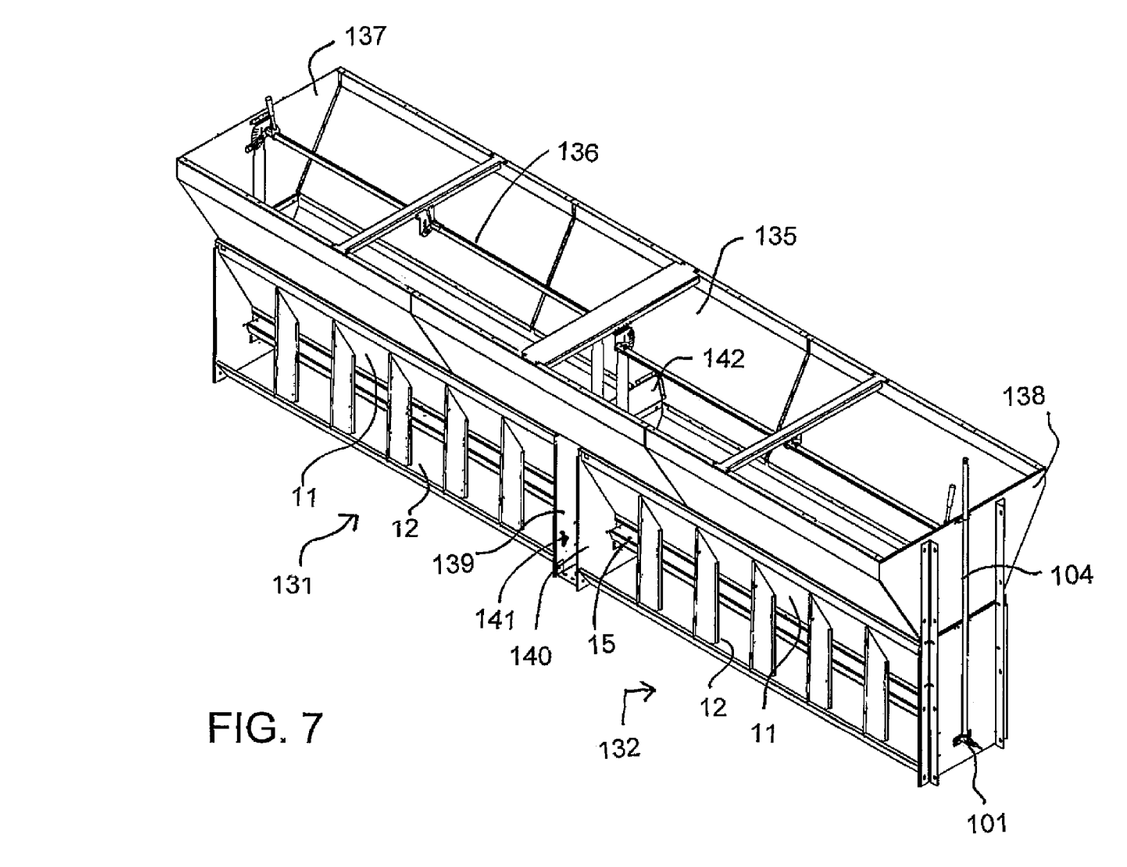
FIG. 7 is an isometric view showing two feeders arranged end to end.
Figure 8:
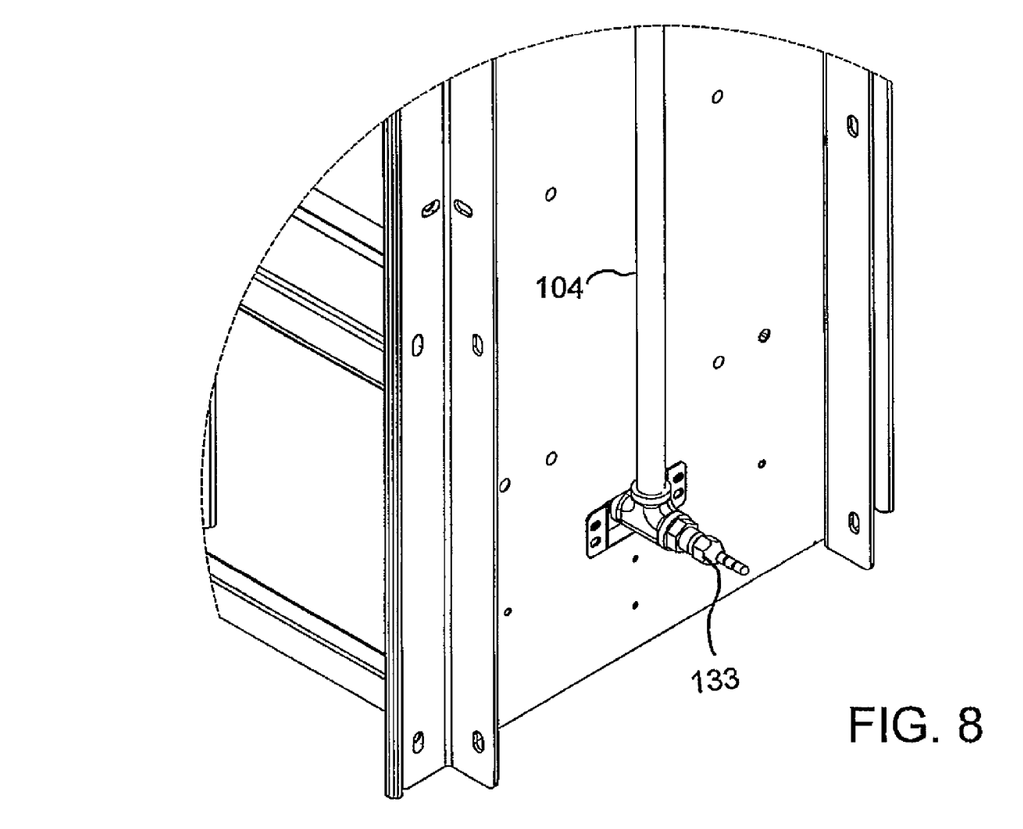
FIG. 8 is an isometric view on an enlarged scale of one end only of the feeders of FIG. 7.
Figure 9:
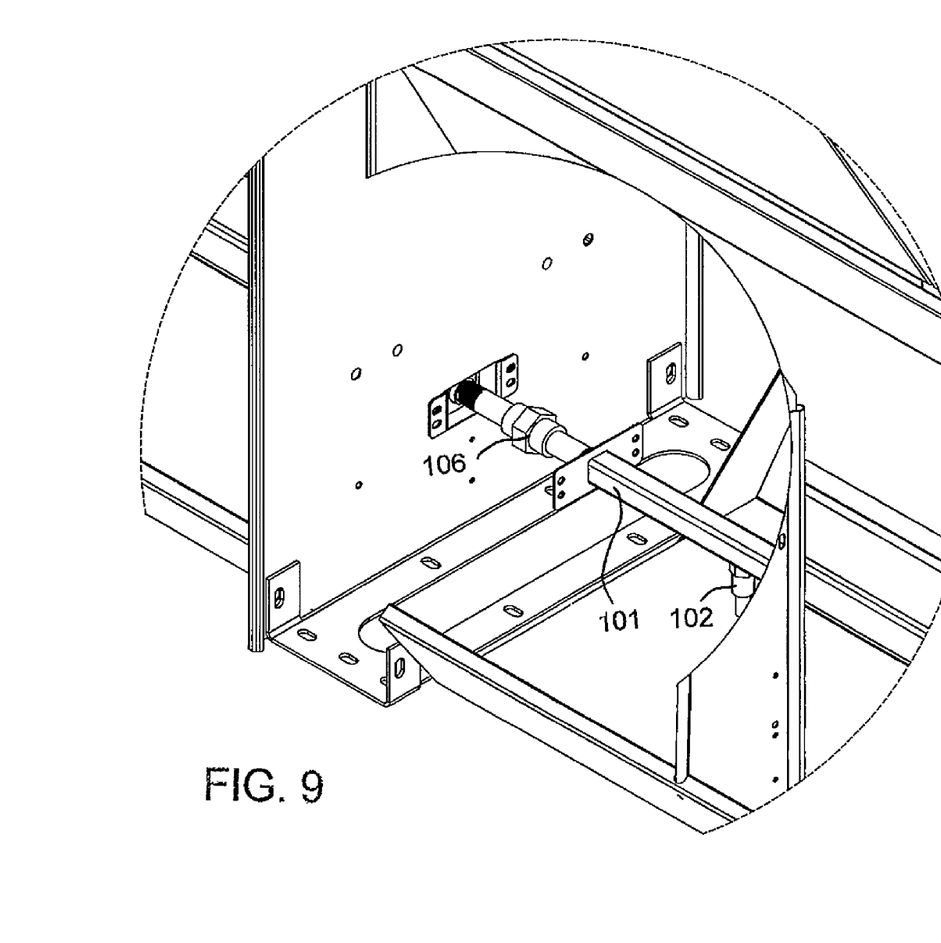
FIG. 9 is an isometric view partly broken away on an enlarged scale of the junction between the feeders of FIG. 7.

As shown in FIGS. 7, 8 and 9, the feeder comprises a pair of feeders 131, 132 arranged end to end each having a respective hopper 11, a respective trough 12 and a respective shelf 15. There is provided a water line 101 fed from a supply pipe 104 at one end of one of the feeders. The water line extends along both of the pair of feeders 111, 112 underneath the shelf 15 for supplying water to the troughs. As shown in FIG. 9 the water line of each of the feeders is connected to the water line of the next by a coupling 106. As shown in FIG. 2, there is provided an electric heater element 103 connected to an electric coupling 133 at one end of one of the feeders so that the electric heating elements passes from the coupling 133 inside the water line and extends along the water line along both of the feeders so as to provide heat to both feeders from a common heater element. This prevents the water lines from freezing in a situation where the feeders are located in an un-heated area. The use of a single heater along both feeders significantly reduces the cost of the system including the controls.

As shown in FIG. 7, the two hoppers 11 of the feeders 131 and 132 are connected to a common upper hopper extension 135 which supplies feed to the hoppers of both of the feeders. This extends along both feeders to end walls 137 and 138 at the end walls of the hoppers 11 of the two feeders and has no dividing wall at the center. Thus both hoppers are fed by a common hopper supply above the feeders to increase the capacity for the animals to reduce filling frequency.

The hoppers of the two feeders are spaced at end walls 139, 140 but the extension portion is common and bridges the area 141 between the end walls 139, 140. Thus the feeders define a separate area 141 therebetween and there is provided a divider member 142 in the common hopper extension to direct the feed into one or other of the hoppers 11 and not into the area therebetween.

In FIG. 7, the adjustment devices are maintained separate so that each feeder is adjusted independently. However it is also possible to provide an adjustment linkage for operating adjustment movement of the shelf of each of the hoppers. In this case the linkages include a common bar is provided which adjusts the straps of both the shelves in a common adjustment action.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. An animal feeder comprising:
   a hopper for containing a feed material to be dispensed to an animal for feeding therefrom;

a receptacle for receiving the feed from the hopper from which the animal can take the feed;

an elongate opening through which the feed passes so that the amount of feed discharged from the hopper to the receptacle is controlled by a width of the opening;

the opening being defined on one side by an elongate member extending along the opening and movable transversely of the opening to change the width of the opening along the length of the opening;

and an adjustment linkage for operating adjustment movement of the elongate member, the linkage including:

a plurality of upstanding support members at spaced positions along the elongate member;

each support member being movable upwardly and downwardly to different heights generally along its length to raise and lower the elongate member;

a gauge for indicating to a user a height of at least one of the upstanding support members such that the user can select a required height;

an adjustment bar interconnecting all of the upstanding support members for common adjustment of the height thereof;

and a manually adjustable lever mounted for pivotal movement about a pivot axis for rotating the bar so as to commonly adjust the upstanding support members.

2. The feeder according to claim 1 wherein the bar is located in the hopper at a height above the elongate member.

3. The feeder according to claim 1 wherein a respective one of the upstanding support members is located at each respective end of the elongate member and at least one additional upstanding support member is located between the ends.

4. The feeder according to claim 3 wherein there is provided a gauge at each end of the elongate member.

5. The feeder according to claim 1 wherein there is provided a lock member for holding one of the upstanding support members at a selected height.

6. The feeder according to claim 5 wherein the lock member is located at the gauge.

7. The feeder according to claim 1 wherein the lever is located at the gauge.

8. The feeder according to claim 1 wherein the lever is located inside the hopper at one end of the feeder.

9. The feeder according to claim 1 wherein the lever is located outside the hopper on one end of the feeder at height inaccessible by the animals.

10. The feeder according to claim 1 wherein the bar is mounted for pivotal movement around a pivot axis fixed relative to ends of the hopper and wherein there is provided a crank extending from the bar to the upstanding support member so that the upstanding support member is adjusted in height by rotation of the bar around the axis.

11. The feeder according to claim 10 wherein the gauge comprises a plate defining a surface over which the crank moves, the surface defining an arcuate portion lying on an arc of a circle surrounding the pivot axis of the bar; wherein the arcuate portion of the surface is serrated to define an arcuate row of teeth; wherein the crank has an edge which is also serrated with a row of teeth shaped to mesh with the teeth of the arcuate portion; and wherein the crank is being movable from a meshing position locking the upstanding support member in a locked position to a non-meshing position in which the upstanding support member is free to move upwardly and downwardly.

12. The feeder according to claim 11 wherein the plate lies in a radial plane of the pivot axis and the arcuate row of teeth are located on an edge of the plate.

13. The feeder according to claim 12 wherein the edge of the plate is an outer edge facing radially outwardly of the axis.

14. The feeder according to claim 13 wherein the crank is formed by a flat of sheet material which lies in a plane parallel to and slides over the plate and wherein the crank includes a portion thereof which is bent out of a plane of the crank into the plane of the plate and carries the row of teeth of the crank on an edge thereof.

15. The feeder according to claim 1 wherein there is provided a trough into which the feed can fall and wherein the elongate member comprises a shelf mounted above the trough arranged so that the animal can take feed from the shelf or can move the feed from the shelf to the trough and wherein the upstanding support member is connected to the shelf for adjustment of the height thereof relative to a bottom edge of the hopper defining the opening therebetween.

16. The feeder according to claim 15 wherein the feeder comprises a pair of feeders arranged end to end each having a respective hopper, a respective trough and a respective shelf; wherein there is provided a water line extending along the pair of feeders underneath the shelf for supplying water to the troughs and wherein there is provided a heater element at the water line and extending along the water line along both of the feeders so as to provide heat to both feeders from a common heater element.

17. The feeder according to claim 16 wherein the common heater element is located inside the water line.

18. An animal feeder comprising:

a pair of feeders arranged end to end, each feeder comprising:

a hopper for containing a feed material to be dispensed to an animal for feeding therefrom;

a trough for receiving the feed from the hopper from which the animal can take the feed;

a shelf mounted above the trough arranged so that the animal can take feed from the shelf or can move the feed from the shelf to the trough;

the shelf defining with a bottom edge of the hopper an elongate opening through which the feed passes so that the amount of feed discharged from the hopper to the receptacle is controlled by a width of the opening;

wherein there is provided a water line extending along the pair of feeders underneath the shelf for supplying water to the troughs;

and wherein there is provided a heater element at the water line and extending along the water line along both of the feeders so as to provide heat to both feeders from a common heater element.

19. The feeder according to claim 18 wherein the common heater element is located inside the water line.

20. The feeder according to claim 18 wherein the two hoppers of the feeders are connected to a common upper hopper extension which supplies feed to the hoppers of both of the feeders.

21. The feeder according to claim 18 wherein the hoppers of the two feeders are spaced so as to define a separate area therebetween and wherein there is provided a divider member in the common hopper extension to direct the feed into one or other of the hoppers.

22. The feeder according to claim 18 wherein there is provided an adjustment linkage for operating adjustment movement of the shelf of each of the hoppers, the linkage including:

a plurality of upstanding support members at spaced positions along the shelves of the hoppers;

each support member being movable upwardly and downwardly to different heights generally along its length to raise and lower the shelves;

a gauge for indicating to a user a height of at least one of the upstanding support members such that the user can select a required height;

an adjustment bar interconnecting all of the upstanding support members for common adjustment of the height thereof;

and a manually adjustable lever mounted for pivotal movement about a pivot axis for rotating the bar so as to commonly adjust the upstanding support members.

23. An animal feeder comprising:

a pair of feeders arranged end to end, each feeder comprising:

a hopper for containing a feed material to be dispensed to an animal for feeding therefrom;

a receptacle for receiving the feed from the hopper from which the animal can take the feed;

an elongate opening through which the feed passes so that the amount of feed discharged from the hopper to the receptacle is controlled by a width of the opening;

the opening being defined on one side by an elongate member extending along the opening and movable transversely of the opening to change the width of the opening along the length of the opening;

and an adjustment linkage for operating common adjustment movement of the elongate members of the feeders, the linkage including:

a plurality of upstanding support members at spaced positions along the elongate member;

each support member being movable upwardly and downwardly to different heights generally along its length to raise and lower the elongate members;

a gauge for indicating to a user a height of at least one of the upstanding support members such that the user can select a required height;

an adjustment bar interconnecting all of the upstanding support members for common adjustment of the height thereof;

and a manually adjustable lever mounted for pivotal movement about a pivot axis for rotating the bar so as to commonly adjust the upstanding support members.

24. The feeder according to claim 23 wherein the two hoppers of the feeders are connected to a common upper hopper extension which supplies feed to the hoppers of both of the feeders.

* * * * *